A. W. SMITH.
ANIMAL BLANKET.
APPLICATION FILED JUNE 8, 1910.
994,663.
Patented June 6, 1911.
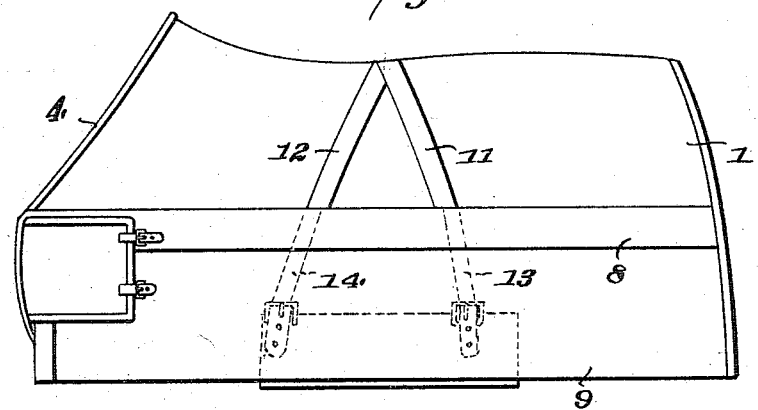
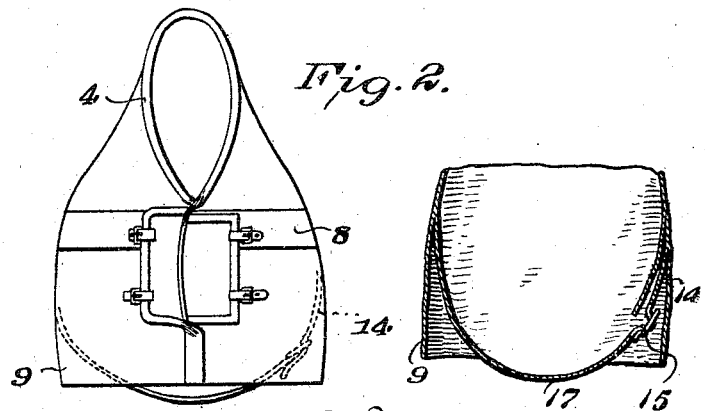
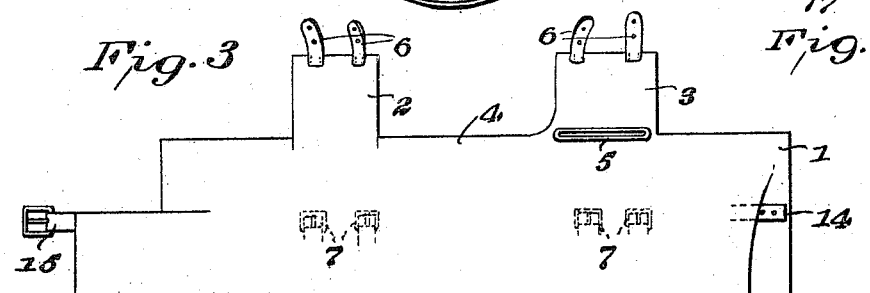
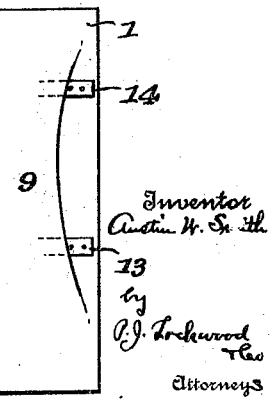
Witnesses
J. A. Bishop
J. H. Shelly
Inventor
Austin W. Smith
by
P. J. Lockwood
Leo
Attorneys

UNITED STATES PATENT OFFICE.

AUSTIN W. SMITH, OF LEBANON, KENTUCKY.

ANIMAL-BLANKET.

994,663.  Specification of Letters Patent.  Patented June 6, 1911.

Application filed June 8, 1910. Serial No. 565,755.

*To all whom it may concern:*

Be it known that I, AUSTIN W. SMITH, a citizen of the United States, residing at Lebanon, in the county of Marion and State of Kentucky, have invented new and useful Improvements in Animal-Blankets, of which the following is a specification.

This invention relates to animal blankets of the class which completely envelops the body of the animal without in any way interfering with freedom of motion.

It is particularly designed to protect the animal, at his most susceptible points, from colds and various ailments incident to an overheated condition and is particularly constructed so that it may be worn by the animal and held from displacement without in any way causing discomfort such as frequently results from the use of cords and the like for fastening means.

The chest of an animal is inevitably the weakest point and the one which needs protection most.

This invention is therefore further designed to provide complete and adequate covering means for the animal's chest without in any way complicating attachment or adjustment. In short, my device is constituted of a body surrounding portion having a double-breasted front and an auxiliary flap protecting the belly of the animal.

Referring more particularly to the accompanying drawings, in which similar reference characters designate corresponding parts, Figure 1 is a side elevation of my animal blanket in wearing position, Fig. 2, is a front view of my blanket in wearing position, and Fig. 3, is a plan view of my blanket spread out. Fig. 4 is transverse section through Fig. 1.

In the drawings, 1 designates my improved blanket comprising a rectangularly shaped body portion preferably having spaced, integrally formed flaps 2 and 3 formed on its forward edge and preferably hemmed between said flaps as at 4 to provide a neck embracing portion.

At the junction of the flap 3 with the front edge of the blanket is provided a slit designated 5 of sufficient length to permit of the passage of the flap 2 therethrough when the blanket is in position on the animal.

It will be apparent from inspection of Figs. 1 and 2 that the structure above recited constitutes a means for producing a double breasted blanket and one which will entirely protect the chest of the animal from excess air. I preferably provide the flaps 2 and 3 on their outermost ends with straps 6, adapted to co-act with buckles 7 fastened to the body of the blanket to facilitate adjustment and fitting to animals of varying sizes. I desire it understood that this choice of fastening means is only tentative and may be superseded in actual construction by hooks and eyes or any other form of fastening means. Ordinarily my improved blanket is constructed from one piece of single layer material forming a cover for the back of the animal and bounded by a strap 8 which serves to connect therewith auxiliary double layer portions 9 and 10. In the preferred form of my invention I provide my blanket with intersecting tapes or straps 11 and 12 extending across the single layer portion and terminating on one side of the blanket in loose straps 13 and 14 depending within the double layer portion and on the other side of the blanket extending as at 15 and 16 to provide buckle members and to form portions of the belly protecting flap 17. It will be noted that the buckle members 15 and 16 when in coöperative relation with the straps 13 and 14 are within the pocket formed by the double thick portion 9, whereby buckles and straps are continually protected from dirt and rust thereby greatly prolonging their life.

Having thus fully described my invention what I claim as new and desire to secure by Letters Patent of the United States, is:—

An animal blanket comprising a body portion of single layer material, depending sides of double layer material, a belly protecting flap on one of said sides, a pocket formed by the double layer structure of the opposite side into which said flap extends.

In testimony whereof I affix my signature in the presence of two witnesses.

AUSTIN W. SMITH.

Witnesses:
 H. P. SMOCK.
 C. A. SMITH.